(12) United States Patent
Biskeborn et al.

(10) Patent No.: US 9,489,525 B2
(45) Date of Patent: Nov. 8, 2016

(54) SECURE STORAGE SYSTEM

(71) Applicant: INTERNATIONAL BUSINESS MACHINES CORPORATION, Armonk, NY (US)

(72) Inventors: Robert G. Biskeborn, Hollister, CA (US); Paul M. Greco, Tucson, AZ (US); Jason Liang, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 14/339,818

(22) Filed: Jul. 24, 2014

(65) Prior Publication Data

US 2016/0026808 A1 Jan. 28, 2016

(51) Int. Cl.
G06F 21/00 (2013.01)
G06F 21/62 (2013.01)
H04L 9/08 (2006.01)

(52) U.S. Cl.
CPC ............. G06F 21/62 (2013.01); H04L 9/0894 (2013.01)

(58) Field of Classification Search
CPC ..................................................... G06F 21/602
See application file for complete search history.

(56) References Cited

U.S. PATENT DOCUMENTS

| 7,146,009 | B2 * | 12/2006 | Andivahis | H04L 63/06 380/277 |
| 7,660,959 | B2 | 2/2010 | Asher et al. | |
| 7,809,880 | B2 | 10/2010 | Forbis et al. | |
| 8,266,433 | B1 | 9/2012 | Przykucki et al. | |
| 8,386,706 | B2 | 2/2013 | Koeppe et al. | |
| 8,520,855 | B1 * | 8/2013 | Kohno | G06F 21/602 380/259 |
| 2004/0190723 | A1 * | 9/2004 | Fukuda | G06F 21/10 380/277 |
| 2005/0080992 | A1 * | 4/2005 | Massey | G06F 3/0605 711/114 |
| 2005/0157878 | A1 * | 7/2005 | Matsushita | H04N 7/162 380/239 |
| 2009/0132830 | A1 * | 5/2009 | Haga | H04L 9/3249 713/189 |
| 2009/0174960 | A1 * | 7/2009 | Koeppe | G06F 21/606 360/53 |
| 2009/0210945 | A1 * | 8/2009 | Kato | G06F 12/1491 726/26 |
| 2010/0083385 | A1 * | 4/2010 | Uchida | G06F 21/606 726/30 |
| 2011/0202763 | A1 | 8/2011 | Martin et al. | |
| 2012/0042162 | A1 * | 2/2012 | Anglin | G06F 21/57 713/165 |
| 2012/0140923 | A1 * | 6/2012 | Lee | H04L 9/0894 380/45 |
| 2012/0166818 | A1 | 6/2012 | Orsini et al. | |
| 2012/0198241 | A1 * | 8/2012 | O'Hare | G06F 21/602 713/189 |
| 2013/0151866 | A1 * | 6/2013 | Koeppe | G06F 21/606 713/193 |
| 2013/0305057 | A1 | 11/2013 | Greco et al. | |

* cited by examiner

Primary Examiner — Morshed Mehedi
(74) Attorney, Agent, or Firm — Matthew C. Zehrer

(57) ABSTRACT

A storage system includes a plurality of drives that write and read data to and from removable storage media communicatively connected to a storage controller. The storage controller receives comprehensible data and divides the comprehensible data into the plurality of data segments comprising the plurality of data units, manipulates one or more of the plurality of data units within each data segment to form the plurality of unintelligible data segments, generates a decoding key based upon the division and the manipulation, and sends each respective unintelligible data segment to the plurality of drives to store upon the removable storage media. The comprehensible data includes a sufficient number of data units arranged in an order of inherent meaning and the unintelligible data segments include an insufficient number of data units to be comprehensible arranged in an order such that the unintelligible data segments are incomprehensible.

20 Claims, 9 Drawing Sheets

SECURE STORAGE SYSTEM

FIELD OF THE INVENTION

Embodiments of the invention generally relate to computer systems and more particularly to securely storing data in a storage system.

DESCRIPTION OF THE RELATED ART

Data security is becoming more important with the exponential growth of data that is stored by various means, such as tape, magnetic or optical data storage. Data encryption provides a user a layer of security, wherein data is algorithmically encrypted and can be accessed using an encryption key. Such encryption normally takes a single data and produces a single secure output, typically using a standard encryption streaming cipher counter mode such as Advanced Encryption Standard Galois/Counter Mode (AES-GCM), and writes this secure data to a singular drive. The data reading process is typically reversed. However, conventional encryption may be overcome, exposing sensitive data to unauthorized access.

FIG. 1A shows a conventional system 10 that uses an exemplary scheme for secure data storage. Each data channel is assigned to a specific writer/reader (W-R) combination in a transducer head. The data is algorithmically encrypted and written to tape. Specifically, FIG. 1 shows 16 channels assigned to a 16 W-R combination head, such that channel 1 is fixed to W-R 1, channel 2 is fixed to W-R 2, etc. Specifically, channel 1 data is written by writer 1 and read back by reader 1, the channel 2 data is written by writer 2 and read back by reader 2, and so on. The channel 1 data is from reader 1 and the channel 2 data is from reader 2, and so on. The data read back is then decrypted using a decryption key. However, once the encryption key becomes compromised, the data security in such a tape system is compromised.

FIG. 1B shows a storage system wherein data 31 is separated/divided into multiple channels by a separator 32A. A key code generator 34 provides a key code to a controller 39 that controls an assignment module 15 that assigns each data channel to a W-R combination based on the key code. As such, channel 1 data is not always assigned to writer 1, but rather assigned to a writer based on a key code. In one example, based on a key code, writer 1 receives data from channel 4, rather than always from channel 1.

A different key code provides a different assignment of channel data to writers. For example, according to another key code, writer 1 may receive data from another channel, such as channel 9 or channel 10, etc.

The key code allows for scrambling of the sequence of channel data relative to the reader/writer combinations, as written to tape. An original sequence of data units is separated into 16 data channels such that: channel 1 includes a subset of the data units appearing first in the sequence, channel 2 includes a subset of the data units appearing second in the sequence, channel 3 includes a subset of the data units appearing third in the sequence, and so on. Upon reading back the data, the key code is required by a combiner 32B to reassemble the data into its original sequence. However, because each subset of the data units is comprehensible data (e.g. data that is meaningful), it is possible that an intruder may obtain the comprehensible data if the intruder obtains a cartridge.

SUMMARY

In an embodiment of the present invention, a method for securely storing data in a storage system includes dividing comprehensible data into a plurality of data segments each comprising a plurality of data units, manipulating one or more of the plurality of data units within each data segment to form a plurality of unintelligible data segments, generating a decoding key based upon the dividing and the manipulating, and writing each respective unintelligible data segment to a plurality of removable storage media.

In another embodiment of the present invention, a computer program product for securely storing data includes a computer readable storage medium having program instructions embodied therewith readable to cause a storage system to divide comprehensible data into the plurality of data segments each data segment comprising the plurality of data units, manipulate one or more of the plurality of data units within each data segment to form the plurality of unintelligible data segments, generate the decoding key based upon the dividing and the manipulating, and write each respective unintelligible data segment to a plurality of removable storage media.

In yet another embodiment of the present invention, storage system includes a plurality of drives that write data upon removable storage media communicatively connected to a storage controller. The storage controller receives comprehensible data and divides the comprehensible data into the plurality of data segments comprising the plurality of data units, manipulates one or more of the plurality of data units within each data segment to form the plurality of unintelligible data segments, generates a decoding key based upon the division and the manipulation, and sends each respective unintelligible data segment to the plurality of drives to store upon the removable storage media.

These and other embodiments, features, aspects, and advantages will become better understood with reference to the following description, appended claims, and accompanying drawings.

DETAILED DESCRIPTION

Embodiments of the invention generally relate to computer systems and more particularly to storage systems that store and retrieve comprehensible data by writing and reading unintelligible data segments to a plurality of removable storage media. The storage system stores the comprehensible data in unintelligible data segments spread among the plurality of removable storage media and generates an associated decoding key. The unintelligible data segments written to the particular removable storage media are incomprehensible, even when the removable storage media is undesirably obtained and software encryption is broken. For an intruder to obtain the comprehensible data, the intruder must know how many removable storage media the comprehensible data was stored upon, which particular removable storage media the comprehensible data was stored upon, the location of the particular removable storage media, the decoding key, and have physically acquired the removable storage media cartridges. The unintelligible data segments from the various removable storage media can be read and arranged to the comprehensible data utilizing the decoding key credential.

Figure 1A:
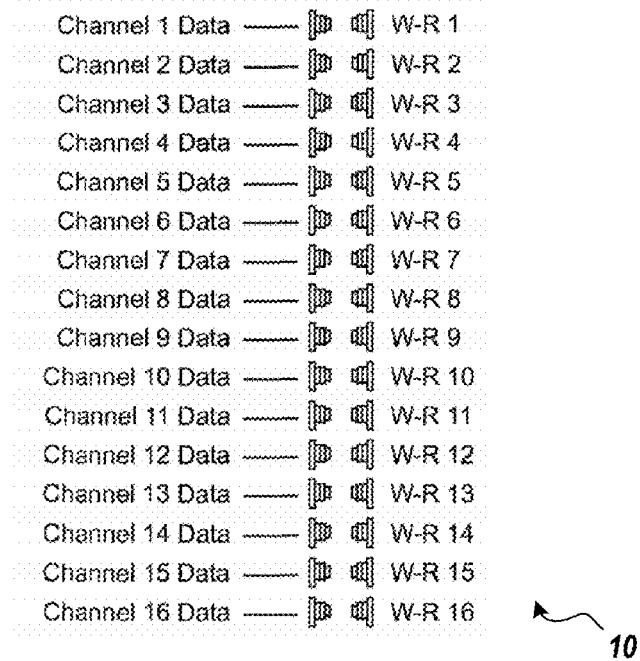
FIG. 1A-FIG. 1B illustrate a conventional storage system for secure data storage.
Figure 1B:
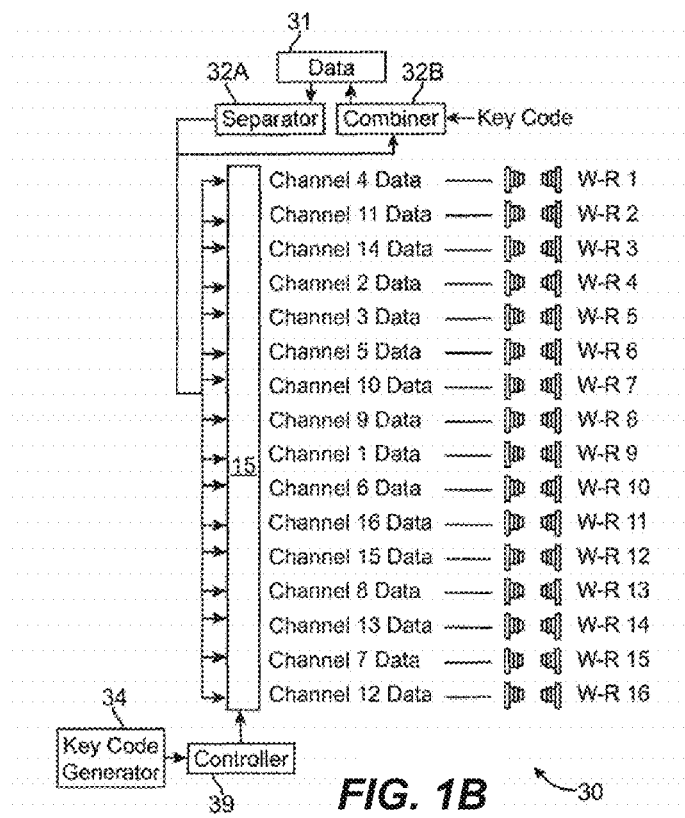
Figure 2:
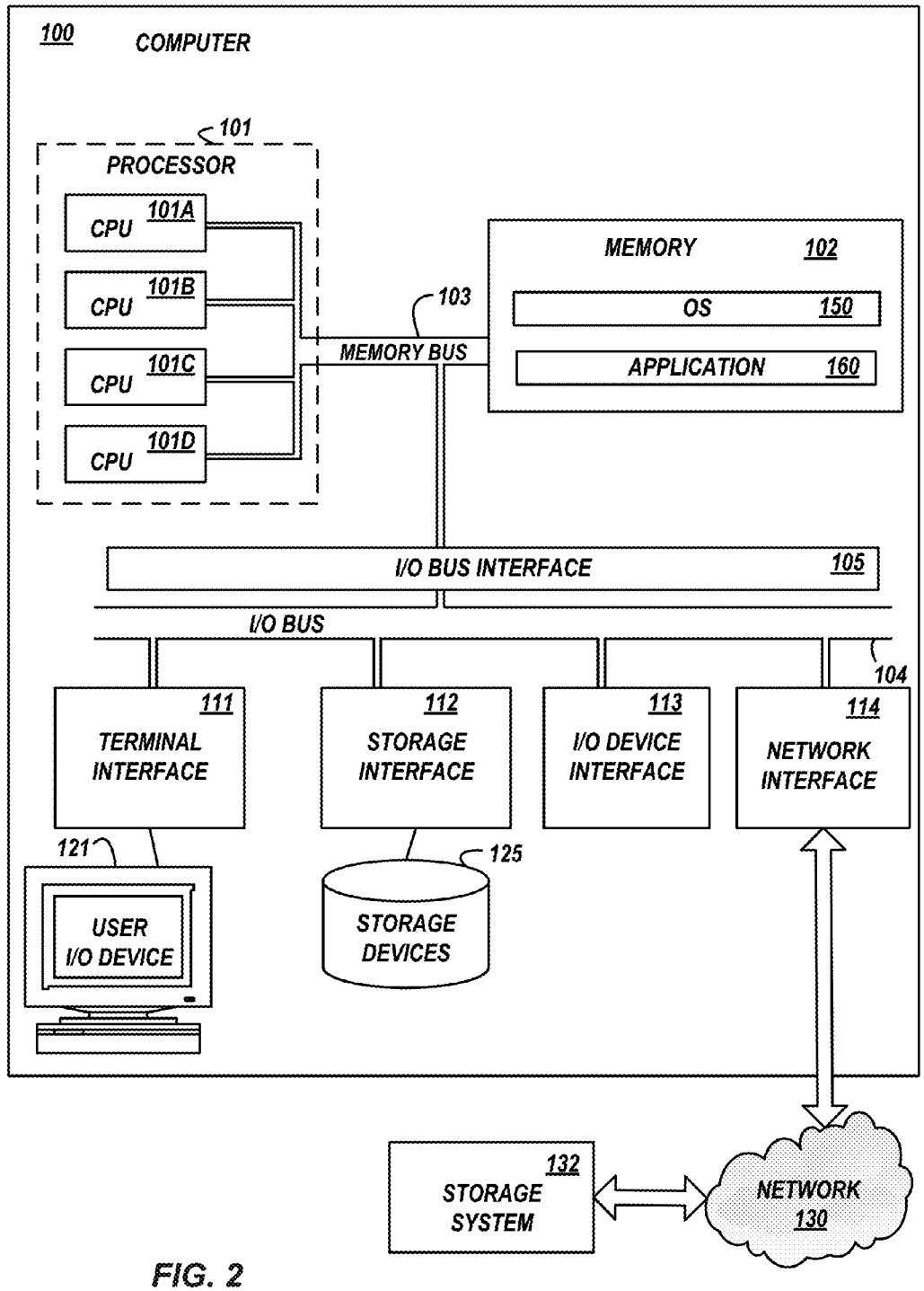
FIG. 2 illustrates a high-level block diagram of an exemplary data handling system for implementing various embodiments of the invention.

Referring to the Drawings, wherein like numbers denote like parts throughout the several views, FIG. 2 depicts a high-level block diagram representation of a computer 100 connected to a storage system 132 via a network 130, according to an embodiment of the present invention. The term "computer" is used herein for convenience only, and in various embodiments is a more general data handling system. The mechanisms and apparatus of embodiments of the present invention apply equally to any appropriate data handling system.

The major components of the computer 100 may comprise one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105. The computer 100 contains one or more general-purpose programmable central processing units (CPUs) 101A, 101B, 101C, and 101D, herein generically referred to as the processor 101. In an embodiment, the computer 100 contains multiple processors typical of a relatively large system; however, in another embodiment the computer 100 may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium for storing or encoding data and programs. In another embodiment, the main memory 102 represents the entire virtual memory of the computer 100, and may also include the virtual memory of other computer systems coupled to the computer 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes an operating system 150, an application 160, and/or other program instructions. Although the operating system 150, an application 160, etc. are illustrated as being contained within the memory 102 in the computer 100, in other embodiments some or all of them may be on different computer systems and may be accessed remotely, e.g., via the network 130. The computer 100 may use virtual addressing mechanisms that allow the programs of the computer 100 to behave as if they only have access to a large, single storage entity instead of access to multiple, smaller storage entities.

Thus, while operating system 150, application 160, or other program instructions are illustrated as being contained within the main memory 102, these elements are not necessarily all completely contained in the same storage device at the same time. Further, although operating system 150, an application 160, other program instructions, etc. are illustrated as being separate entities, in other embodiments some of them, portions of some of them, or all of them may be packaged together.

In an embodiment, operating system 150, an application 160, and/or other program instructions comprise instructions or statements that execute on the processor 101 or instructions or statements that are interpreted by instructions or statements that execute on the processor 101, to carry out the functions as further described below with reference to FIGS.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer 100, and may receive output data via the user output devices. For example, a user interface may be presented via the user I/O device 121, such as displayed on a display device, played via a speaker, or printed via a printer.

The storage interface unit 112 supports the attachment of one or more local disk drives or secondary storage devices 125. In an embodiment, the secondary storage devices 125 are rotating magnetic disk drive storage devices, but in other embodiments they are arrays of disk drives configured to appear as a single large storage device to a host computer, or any other type of storage device. The contents of the main memory 102, or any portion thereof, may be stored to and retrieved from the secondary storage devices 125, as needed.

The local secondary storage devices 125 have a slower access time than does the memory 102, meaning that the time needed to read and/or write data from/to the memory 102 is less than the time needed to read and/or write data from/to for the local secondary storage devices 125.

The I/O device interface 113 provides an interface to any of various other input/output devices or devices of other types, such as printers or fax machines. The network adapter 114 provides one or more communications paths from the computer 100 to other data handling devices such as storage system 132; such paths may comprise, e.g., one or more networks 130. Although the memory bus 103 is shown in FIG. 2 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

I/O interface 113 may contain electronic components and logic to adapt or convert data of one protocol on I/O bus 104 to another protocol on another bus. Therefore, I/O interface 113 may connect a wide variety of devices to computer 100 and to each other such as, but not limited to, tape drives, optical drives, printers, disk controllers, other bus adapters, PCI adapters, workstations using one or more protocols including, but not limited to, Token Ring, Gigabyte Ethernet, Ethernet, Fibre Channel, SSA, Fiber Channel Arbitrated Loop (FCAL), Serial SCSI, Ultra3 SCSI, Infiniband, FDDI, ATM, 1394, ESCON, wireless relays, Twinax, LAN connections, WAN connections, high performance graphics, etc.

Though shown as distinct entities, the multiple I/O interface units 111, 112, 113, and 114 or the functionality of the I/O interface units 111, 112, 113, and 114 may be integrated into a similar device.

In various embodiments, the computer 100 is a multi-user mainframe computer system, a single-user system, a storage server, or a server computer or similar device that has little or no direct user interface, but receives requests from other computer systems (clients). In other embodiments, the computer 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer 100 and at least the storage system 132. In various embodiments, the network 130 may represent a data handling device or a combination of data handling devices, either connected directly or indirectly to the computer 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

In an embodiment, the storage system 132 may comprise some or all of the elements of the computer 100.

FIG. 2 is intended to depict the representative major components of the computer 100. But, individual components may have greater complexity than represented in FIG. 2, components other than or in addition to those shown in FIG. 2 may be present, and the number, type, and configuration of such components may vary. Several particular examples of such additional complexity or additional variations are disclosed herein; these are by way of example only and are not necessarily the only such variations. The various program instructions implementing e.g. upon computer system 100 according to various embodiments of the invention may be implemented in a number of manners, including using various computer applications, routines, components, programs, objects, modules, data structures, etc., and are referred to hereinafter as "computer programs, "or simply "programs."

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
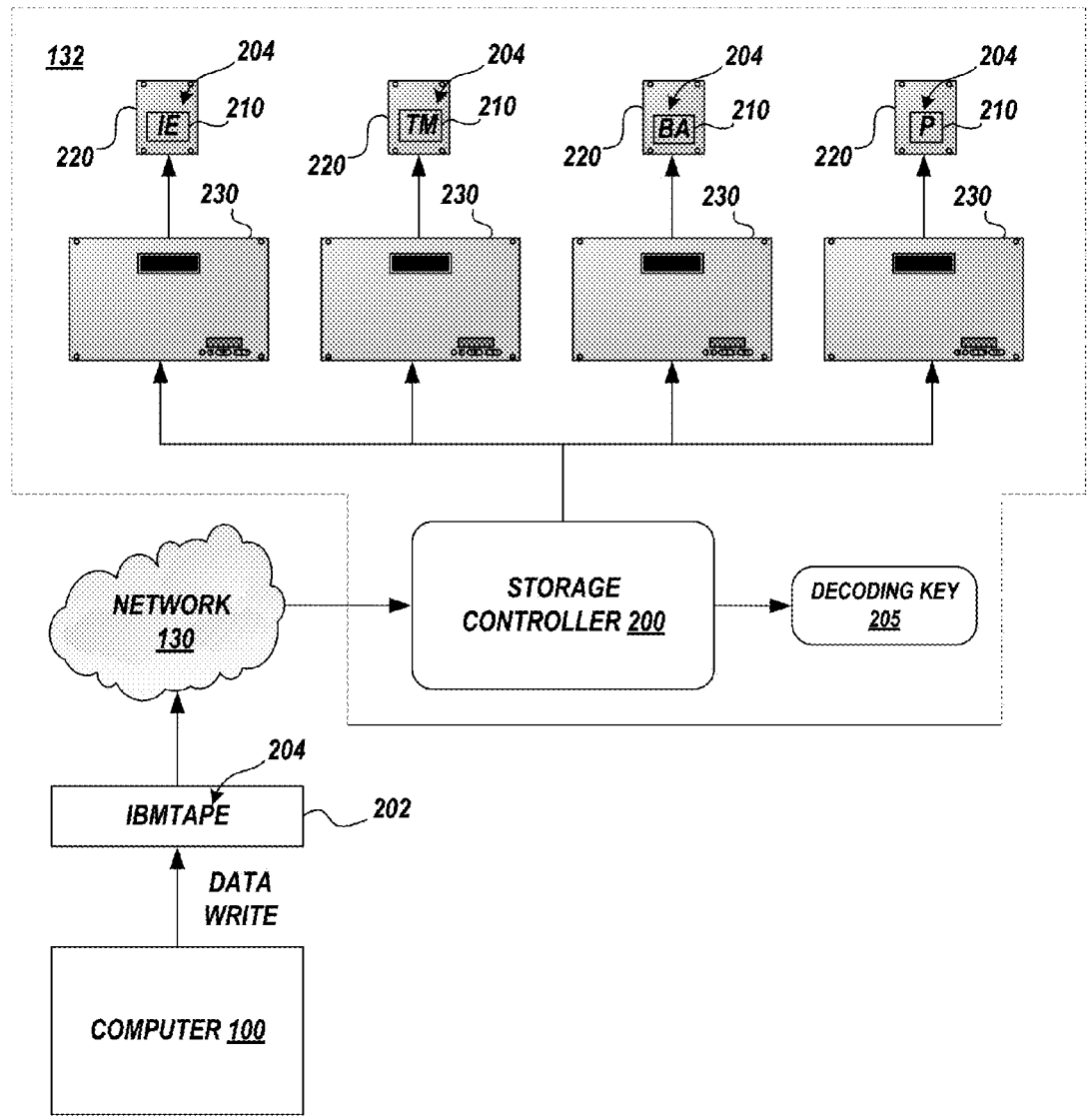
FIG. 3 illustrates an exemplary storage system for storing comprehensible data by writing unintelligible data segments, according to various embodiments of the present invention.
Figure 4:
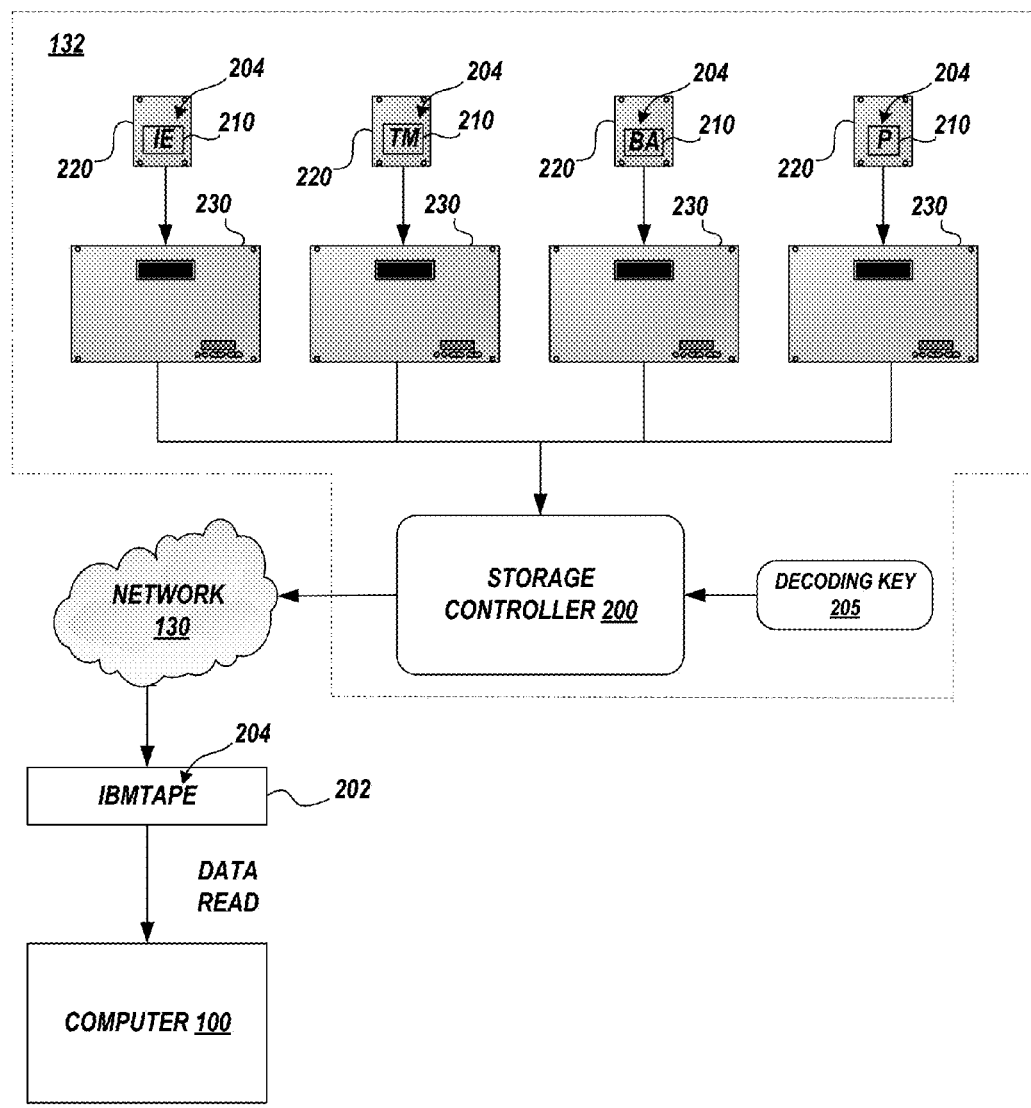
FIG. 4 illustrates an exemplary storage system for retrieving comprehensible data by reading unintelligible data segments, according to various embodiments of the present invention.

Refer to FIG. 3 that illustrates an exemplary storage system 132 for storing comprehensible data 202 by writing unintelligible data segments 210 and to FIG. 4 that illustrate storage system 132 for retrieving comprehensible data 202 by reading unintelligible data segments 210.

Storage system 132 includes a storage controller 200 that receives a store request or retrieve request for comprehensible data 202 from computer 100 and sends write request or read request for unintelligible data segments 210 to a plurality of drives 230. In certain embodiments, the storage controller 200 may comprise some or all of the elements of the computer 100 and be communicatively connected to other data handling devices such as computer 100, drives 230, etc. via network 130. In other embodiments, storage controller 200 may be a device e.g. an application specific integrated circuit (ASIC), etc. connected to memory bus 103, I/O bus 104, etc. Generally, storage controller 200 manipulates comprehensible data 202 to form a plurality of unintelligible data segments 210 and generates an associated decoding key 205. Storage controller 200 may then send the unintelligible data segments 210 to drives 230 to be written to removable storage media 220. Storage controller 200 also requests the unintelligible data segments 210 from drives 230 and utilizes the decoding key 205 to synthesize the unintelligible data segments 210 back to comprehensible data 202. Storage controller 200 may return the comprehensible data 202 to a requesting data handling device, such as computer 100.

Generally, comprehensible data 202 includes a sufficient number of data units 204 arranged in an order of inherent meaning or usefulness. On the other hand, unintelligible data segments 210 include an insufficient number of data units 204 arranged in an order of that is not interpretable. In this manner the inherent meaning or otherwise usefulness of comprehensible data 202 may be masked by the unintelligible data segments 210. In certain embodiments, unintelligible data segment 210 may be completely meaningless (e.g. each data unit 204 of unintelligible data segment 210 is independently unintelligible, etc.). For clarity, exemplary techniques of manipulating comprehensible data 202 into a plurality of unintelligible data segments 210 are described and shown in the drawings. Such examples of unintelligible data segments 210 in the figures may be shown as comprehensible representatives of independently unintelligible data segments 210.

Drive 230 is data storage device used for storing and retrieving information upon or from removable storage media 220. Drive 230 may be connected to storage controller 200 by e.g. network 130, a cable interconnect to e.g. I/O interface 113, etc. and may include an external slot, bay, etc. that which the removable media 220 may be installed and removed. In a particular example, drive 230 may be a tape drive that stores and retrieves information from tape cartridges. In another example, drive 230 may be a DVD drive that stores and retrieves information from DVDs. Generally, removable storage media 220 is a storage media that is configured to be removed from drive 230. For example, a tape cartridge may be removed or installed from a slot in a tape drive by a robotic arm installation and removal system.

According to various embodiments, a secure data storage process includes the storage controller manipulating comprehensible data 202 into a plurality of unintelligible data segments 210. For example, storage controller 200 may separate the comprehensible data 202 into comprehensible segments and manipulate each comprehensible segment to form unintelligible data segments 210, the storage may manipulate the comprehensible data 202 and may divide the manipulated comprehensible data 202 into unintelligible data segments 210, etc.

The secure data storage process may further include the storage controller 200 importing or exporting decoding key 205 associated with the manipulation of comprehensible data 202 into a plurality of unintelligible data segments 210. The decoding key 205 may provide for a mapping of how the comprehensible data 202 is manipulated into a plurality of unintelligible data segments 210. The secure data storage process may further include assigning each unintelligible data segment 210 to a writer of a respective drive 230 and writing each unintelligible data segment 210 to removable media 204 by the assigned writer. In various embodiments, the decoding key 205 is exported to e.g. internal memory 102 of computer 100, internal memory 102 of storage controller 200, one or more drives 230, respective removable media 220, etc. In certain embodiments, the decoding key 205 is unintelligible data. In other embodiments, the decoding key 205 may be comprehensible data 202 and may be manipulated by storage controller 205, in accordance with the various embodiments herein.

Thereafter, retrieving comprehensible data 202 involves the storage controller 200 reading the unintelligible data segments 210 from the removable media 204 using readers of respective drives 230. The secure data storage process may further include the storage controller 200 importing the decoding key 205 associated with the manipulation of comprehensible data 202 into a plurality of unintelligible data segments 210. Using the decoding key 205, storage controller 200 reassembles the unintelligible data segments 210 to comprehensible data 202. For example, using the mapping provide by the decoding key 205, storage controller 200 may unscramble particular data units 204 within a particular unintelligible data segment 210 and may reassemble the various unintelligible data segments 210 to form comprehensible data 202. If the wrong decoding key 205 is imported then data units 204 are reassembled in a sequence that does not represent comprehensible data 202.

In one example, such secure storage of comprehensible data 202 is implemented for data storage on one or more tape cartridges in a tape library system, wherein once the data is stored securely, both software and hardware mechanisms are required to decode and access such data. As noted, in conventional tape libraries, because each subset of the data units is comprehensible data (e.g. data that is meaningful), it is possible that an intruder may obtain the comprehensible data if the intruder obtains a cartridge.

According to embodiments of the invention, however, comprehensible data 202 of a particular sequence of data units 204 is separated into unintelligible data segment 210, and written to tape cartridges via writers assigned to each unintelligible data segment 210 based on decoding key 205. For example, during the writing process, data may be sent through controller 200 which breaks up the data into segments and scrambles data units within each segment to form the unintelligible data segments 210 and decides which unintelligible data segments 210 goes to which tape cartridge. The decoding key 205 is generated based on this data segment division, data unit 204 scrambling, data segment sequence scrambling, etc. Only unintelligible data segment 210 from the assigned channels are sent to the corresponding tape drive to be written on the assigned tape cartridge. The tape drive and cartridges may be all physically located in the same library or at different locations, after the writing is complete, the tape cartridges can be removed and physically be relocated which adds another layer of security. Therefore, the unintelligible data segment 210 is incomprehensible, even when the particular tape cartridge is obtained and software encryption is broken. For an intruder to obtain the comprehensible data 202, the intruder must know how many tape cartridges the comprehensible data 202 was stored upon, which particular tape cartridges the comprehensible data 202 was stored upon, the location of the particular tape cartridge within the library, the decoding key 205, and have physically acquired the tape cartridges. Upon reading back unintelligible data segments 210, the decoding key 205 is required to reassemble the unintelligible data segments 210 to comprehensible data 202. Without the proper decoding key 205, comprehensible data 202 cannot be reassembled.

In various embodiments, decoding key 205 may be exported during or subsequent to the unintelligible data segments 210 being stored upon removable media 220. For example, the generated decoding key 205 may take the form of comprehensible data 202 and the decoding key 205 may be separated into unintelligible data segments 210 wherein each respective unintelligible data segment 210 is stored upon a removable media 220. Alternately, the decoding key 205 may also be generated prior to the separation of comprehensible data 202 into unintelligible data segments 10, and included in the distributed written data. In some embodiment, the decoding key 205 may be itself separated into unintelligible data segments 210 or not. It is preferable that the decoding key 205 may be manipulated into unintelligible data segments 210. For example, the decoding key 205 would also be unintelligible without full possession of the volume set, requiring full possession of the recorded split sets have sufficient information to self determine the proper decode and reassembly method(s), so partial leakage does not occur. In various embodiments, decoding key 205 may be exported prior to, during, or subsequent to writing unintelligible data segments 210 upon removable media 220.

In certain embodiments, storage controller 200 may require that all implicated removable storage media 220 be available prior to initiating data retrieval and reassembly. Such feature may further hinder the intruder, who, for instance, has possession of 7 out of 8 cartridges, from reassembling the available data and figuring out what data is stored on the 8th cartridge.

Figure 5A:
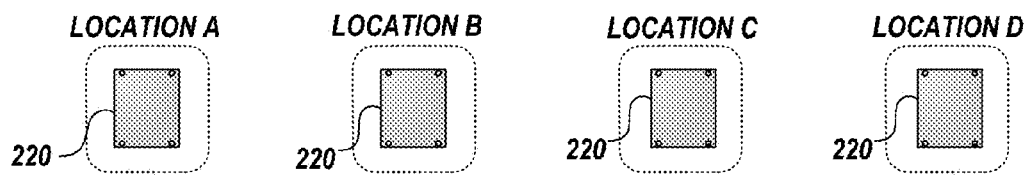
FIG. 5A-FIG. 5C illustrate exemplary removable media location configurations, according to various embodiments of the present invention.
Figure 5B:
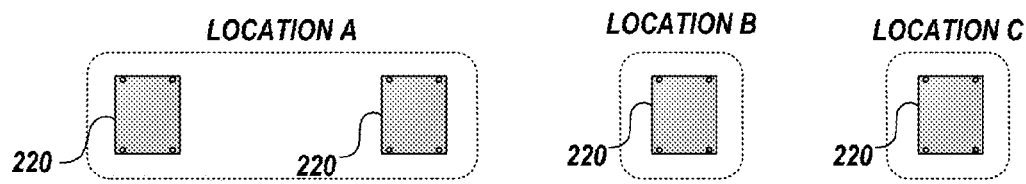
Figure 5C:
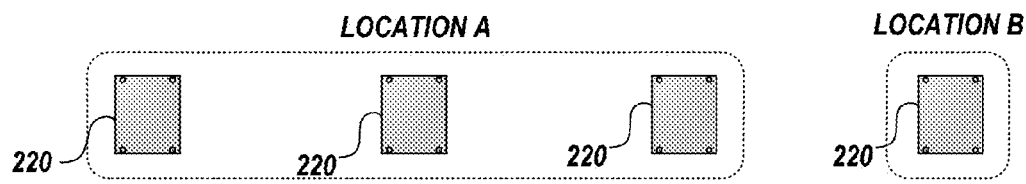

Referring to FIG. 5A-FIG. 5C which illustrate exemplary removable media location configurations. Generally, drives 230 and associated removable media 220 may be all physically located in the same location or all at different locations or such combinations there between. As shown in FIG. 5A, drives 230 may store unintelligible data segments 210 upon removable media 220 physically located in differing locations. For example, each removable media 220 may be included in distinct libraries. As shown in FIG. 5B and in FIG. 5C, drives 230 may store unintelligible data segments 210 upon removable media 220 physically located in similar locations and in differing locations. For example, multiple removable media 220 that which a respective unintelligible data segment 210 is stored may be included in a similar library and one or more removable media 220 that which a respective unintelligible data segment 210 is stored may be included in a distinct library.

Figure 6:
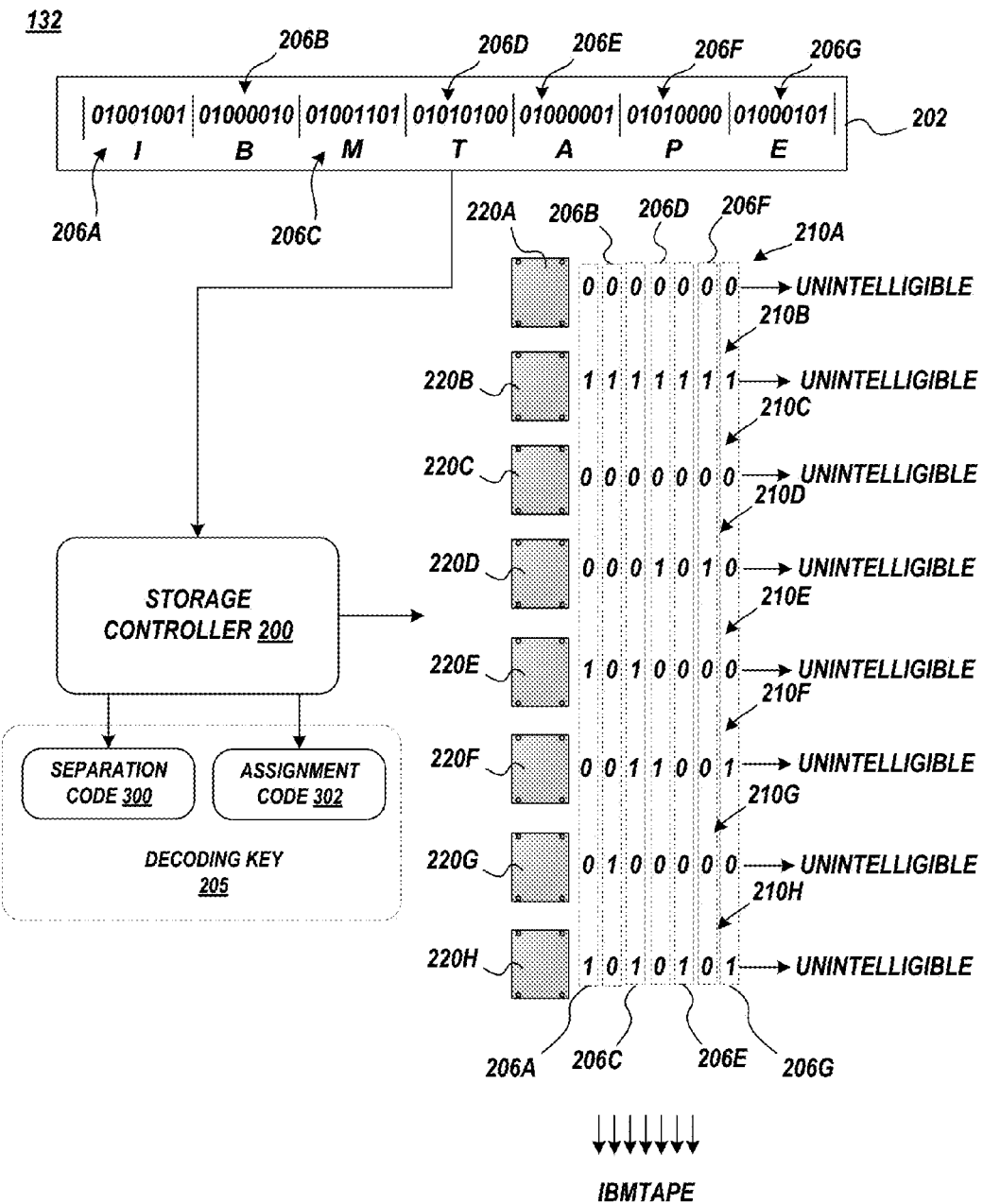
FIG. 6 illustrates an exemplary storage system for storing and retrieving comprehensible data by writing and reading unintelligible data segments, according to various embodiments of the present invention.

FIG. 6 illustrates an exemplary storage system 132 for storing and retrieving comprehensible data 202 by writing and reading unintelligible data segments 210. In various embodiments, decoding key 205 may include multiple components, such as separation code 300 and assignment code 302. Separation code 300 is generated based upon how storage controller 200 divides the comprehensible data 202 into comprehensible data segments 206. For example, storage controller 200 may divide a byte size comprehensible data 202 into multiple comprehensible data segments 206A-206G wherein each comprehensible data segments 206A-206G includes a plurality of data units 204. Comprehensible data segments 206A-206G are portions of comprehensible data 202 of a sufficient number of data units 204 arranged in an order of inherent meaning or otherwise usefulness. In certain embodiments, separation code 300 may be a mapping of how storage controller 200 divides the comprehensible data 202 into comprehensible data segments 206.

Assignment code 302 is generated based upon how storage controller 200 assigns data units 204 of comprehensible data segments 206 to respective writers of various drives 230 and/or associated removable media 220A-220H. As shown in FIG. 6, in an exemplary assignment scheme, storage controller 200 may assign data units 204 of comprehensible data segment 206A-206G to different drives 230 in a manner where unintelligible data segments 210 are stored upon each removable media 220A-220H. For example, storage controller 200 may assign each data unit 204 of comprehensible data segment 206A to different drives 230 and associated removable media 220A-220H. In certain embodiments, assignment code 302 may be a mapping of how storage controller 200 assigns data units 204 of comprehensible data segments 206 to respective writers of various drives 230.

To retrieve comprehensible data 202, storage controller 200 reads the unintelligible data segments 210 from the removable media 220 using readers of respective drives 230 and importing of the associated separation code 300 and assignment code 302. Using the separation code 300 and assignment code 302, storage controller 200 reassembles the unintelligible data segments 210 to comprehensible data 202. For example, using the mapping provide by separation code 300 and assignment code 302, storage controller 200 may unscramble particular data units 204 to recreate comprehensible data segments 206A-206G and reassembles the comprehensible data segment 206A-206G to form comprehensible data 202.

Figure 7:
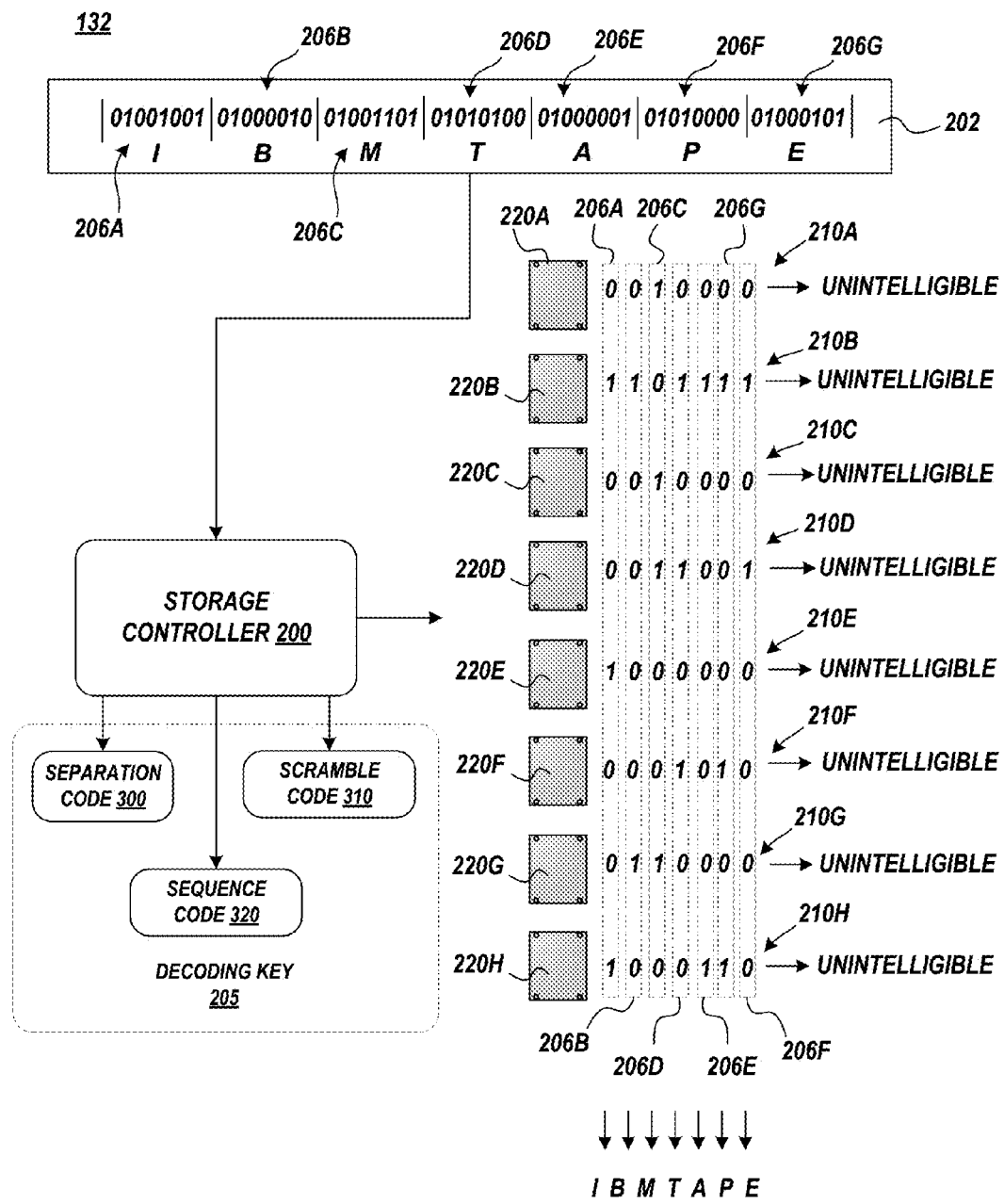
FIG. 7 illustrates an exemplary storage system for storing and retrieving comprehensible data by writing and reading unintelligible data segments, according to various embodiments of the present invention.

FIG. 7 illustrates an exemplary storage system 132 for storing and retrieving comprehensible data 202 by writing and reading unintelligible data segments 210A-210H. In various embodiments, decoding key 205 may include additional or other components, such as scramble code 310 and sequence code 320. Scramble code 310 is generated based upon how storage controller 200 scrambles a sequence of data units 204 within comprehensible data segment 206A-206G to form unintelligible data segments 210A-210H. For example, a 8 bit comprehensible data segment 206 may be scrambled to form an 8 bit unintelligible data segment 210. In such embodiments, the storage controller may write entire unintelligible data segments 210A-210H to respective removable cartridges 220A-220G. Therefore, in such embodiments, sequence code 320 may be generated based upon how storage controller 200 assigns unintelligible data segments 210A-210H to respective writers of various drives 230. In certain embodiments, as shown in FIG. 7, the scramble code may be a parity bit that flips data units 204 within comprehensible data segment 206C to form unintelligible data segment 210. In certain embodiments, scramble code 310 may be a mapping of how storage controller 200 scrambles data units 204 of comprehensible data segments 206A-206G to form unintelligible data segments 210A-210G. In certain embodiments, the storage controller 200 may utilize differing scrambling logic and generate differing scramble codes to form various size, formats, etc. of unintelligible data segments 210.

Sequence code 320 may be generated based upon how storage controller 200 assigns unintelligible data segments 210A-210H to respective writers of various drives 230. For example, comprehensible data 202 may be divided into comprehensible data segments 206A-206G utilizing separation code 300. The data units 204 of each comprehensible data segment 206A-206G may be scrambled utilizing scramble code 310 to form unintelligible data segments 210A-210H. Finally the order of how each unintelligible data sequence 210A-210H is assigned to respective writers of various drives 230 may utilize the sequence code 320. For example, as shown in FIG. 7, the logical order of comprehensible data segment 206F and comprehensible data segment 206G data are inverted.

To retrieve comprehensible data 202, storage controller 200 reads the unintelligible data segments 210A-210H from the removable media 220 using readers of respective drives 230 and imports the associated separation code 300, scramble code 310, and sequence code 320. Using the imported separation code 300, scramble code 310, and sequence code 320, storage controller 200 reassembles the unintelligible data segments 210A-210H to comprehensible data 202. For example, using the mapping provided by separation code 300, scramble code 310, and sequence code 320, storage controller 200 may recreate the comprehensible data segments 206A-206G and may reassemble the various comprehensible data segments 206A-206G in the proper sequence to form comprehensible data 202.

For clarity, storage controller 200 may utilize additional techniques to manipulate comprehensible data 200 into a plurality of unintelligible data segments 210 for storage upon removable media 220. For example, the storage controller 200 may randomly associate unintelligible data segments 210 to all or a subgroup of drives 230 within the storage system 132, the storage controller 200 may vary the sizes of the plurality of unintelligible data segments 210, storage controller 200 may vary the order or sequencing of a first plurality of unintelligible data segments 210 relative to a second plurality of unintelligible data segments 210, storage controller 200 may vary the sizes of data units 204, etc.

Figure 10:
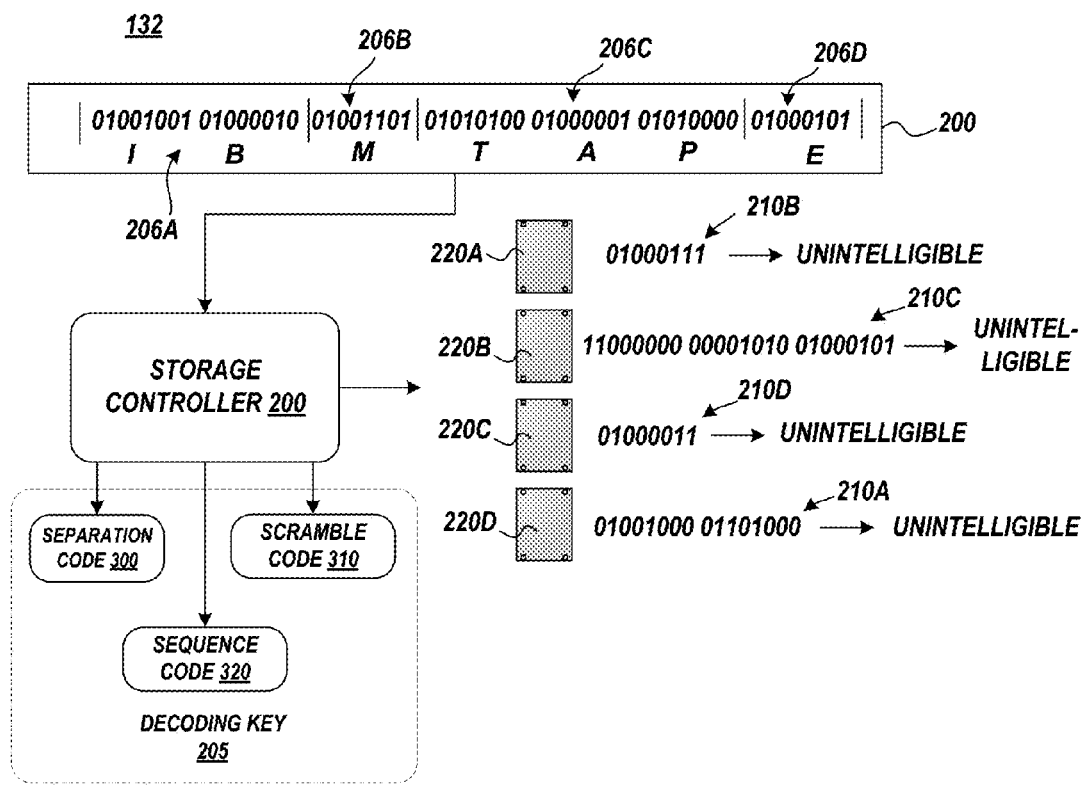
FIG. 10 illustrates an exemplary storage system for storing and retrieving comprehensible data by writing and reading unintelligible data segments, according to various embodiments of the present invention.

For example, in FIG. 10, exemplary storage system 132 for storing and retrieving comprehensible data 202 by writing and reading unintelligible data segments 210A-210D is shown. Storage controller 200 separates comprehensible data 200 into comprehensible data segments 206A-206D and generates separation code 300 based upon how comprehensible data segments 206A-206D are separated. For example, storage controller 200 may separate comprehensible data 200 into a two word comprehensible data segment 206A, single word comprehensible data segments 206B and 206D, and three word comprehensible data segment 206C.

Storage controller 200 scrambles the data units 204 within each respective comprehensible data segment 206A-206D and generates scramble code 310 based upon how comprehensible data segments 206A-206D are scrambled to form unintelligible data segments 210A-210D. For example, storage controller may randomly scramble the data units 204 of comprehensible data segments 206A-206D to form unintelligible data segments 210A-210D.

Further, storage controller 200 assigns the unintelligible data segments 210A-210D to various drives 230 and associated removable media 220A-220D and generates an assignment sequence code 320 based upon the assignment. For example, storage controller 200 assigns the first unintelligible data segment 210A to the fourth drive 230 and associated removable media 220D, assigns the second unintelligible data segment 210B to the first drive 230 and associated removable media 220A, assigns the third unintelligible data segment 210C to the second drive 230 and associated removable media 220C, and assigns the fourth unintelligible data segment 210D to the third drive 230 and associated removable media 220C.

The various embodiments of the present invention described herein may be utilized with traditional software encryption. For example, software may encrypt unintelligible data segments 210. Such traditional software encryption algorithms applied to data either before, after, or both before and after the manipulation of comprehensible data 202 into unintelligible data segments 210, can increase data security conjunctively in combination with the various embodiments of the invention. Such implementations could use common keys, unique keys, derived keys, etc.

Figure 8:
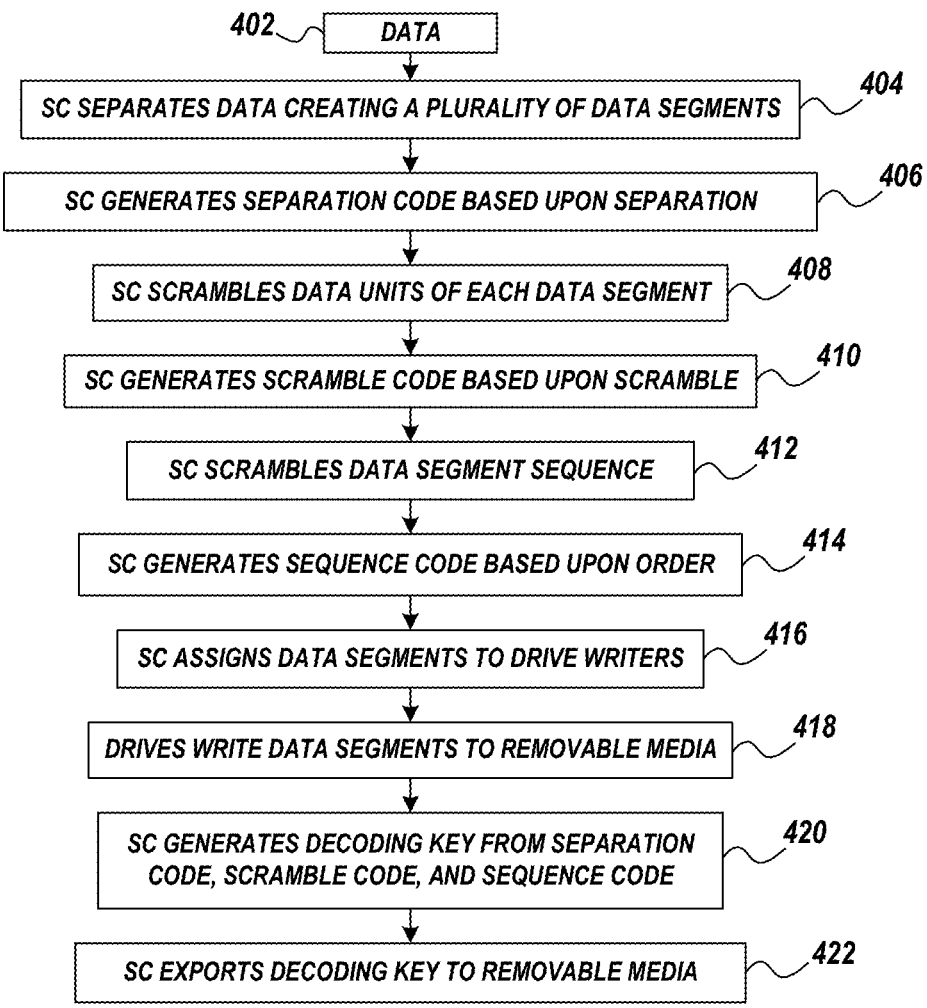
FIG. 8 illustrates an exemplary process for storing comprehensible data by writing unintelligible data segments, according to various embodiments of the present invention.

FIG. 8 illustrates an exemplary process 400 for storing comprehensible data 202 by writing unintelligible data segments 210, according to various embodiments of the present invention. While process 400 shows a specific block ordering, some of these blocks may be omitted or additional blocks and associated logic or functionality added. For example, while process 400 shows a specific order of such blocks culminating in generating the decode key 205 (block 420) and export of the decode key 205 (block 422), the various steps of blocks 420, 422 may be done in other orders, including ones where the decode key 205 is generated before the data is processed or even received, etc.

Process 400 begins at block 402 where storage controller 200 receives comprehensible data 202 comprising a plurality of data units 204. For example, storage controller 200 receives data from computer 100 to be stored in storage system 132.

Process 400 may continue with storage controller 200 dividing or otherwise separating comprehensible data 202 into a plurality of comprehensible data segments 206 (block 404). For example, a first comprehensible data segment 206 may comprise six data units 204, a second comprehensible data segment 206 may comprise twelve data units 204, a third comprehensible data segment 206 may comprise two data units 204, etc. Process 400 may continue with storage controller 200 generating separation code 302 based upon how storage controller 200 separated comprehensible data 202 into a plurality of comprehensible data segments 206 (block 406). For example, the storage controller may generate a separation code 302 that maps how storage controller 200 divided comprehensible data 202 into a plurality of comprehensible data segments 206 whereby the map is known only to storage controller 200.

Process 400 may continue with storage controller 200 scrambling data units 204 of each comprehensible data segment 206 to form unintelligible data segments 210 (block 408). For example, data units 204 of the first comprehensible data segment 206 may be scrambled with first scrambling program instructions or scrambling technique, data units 204 of the second comprehensible data segment 206 may be scrambled with a second scrambling program instructions or scrambling technique, data units 204 of the third comprehensible data segment 206 may be scrambled with a third scrambling program instructions or scrambling technique, etc. In this manner, unintelligible data segments 210 may be generated by differing scrambling techniques by storage controller 210 to increase the difficulty of the intruder forming the associated comprehensible data segment 206 from the unintelligible data segment 210. Process 400 may continue with storage controller 200 generating scramble code 310 based upon how storage controller 200 scrambled data units 204 of each comprehensible data segment 206 (block 410). For example, the storage controller 200 may generate the scramble code 310 that maps how storage controller 200 scrambled data units 204 of each comprehensible data segment 206 to form unintelligible data segments 210, whereby the map is known only to storage controller 200 and is itself unintelligible.

Process 400 may continue with storage controller 200 scrambling the sequence of unintelligible data segments 210 (block 412). For example, the ordering of ten unintelligible data segments 210 may be scrambled. Process 400 may continue with storage controller 200 generating sequence code 320 based upon how storage controller 200 scrambled the ordering of the plurality of unintelligible data segments 210 (block 414). For example, the storage controller 200 may generate the sequence code 414 that maps how storage controller 200 scrambled the ordering of the plurality of unintelligible data segments 210, whereby the map is known only to storage controller 200 and is itself unintelligible.

Process 400 may continue with storage controller 200 assigning the unintelligible data segments 210 to drive writers of drive 220 (block 416) and may continue with drives 230 writing respective unintelligible data segments 210 to removable media 220 (block 418).

Process 400 may continue with storage controller 200 generating decoding key 205 from the separation code 300, from the scramble code 310, and from the sequence code 320 (block 420). For example, the storage controller 200 may combine the separation code 300, the scramble code 310, and the sequence code 320. Process 400 may continue with storage controller 200 exporting the decoding key 205 (block 422). For example, storage controller 200 may export decoding key 205 to e.g. internal memory 102 of computer 100, internal memory 102 of storage controller 200, one or more drives 230, respective removable media 220, etc. In certain embodiments, the decoding key 205 is unintelligible data.

Figure 9:
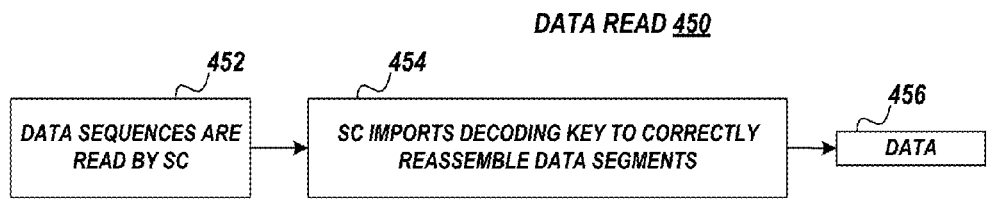
FIG. 9 illustrates an exemplary process for retrieving comprehensible data by reading unintelligible data segments, according to various embodiments of the present invention.

FIG. 9 illustrates an exemplary process 450 for retrieving comprehensible data 202 by reading unintelligible data segments 210, according to various embodiments of the present invention. Process 450 begins with storage controller receiving a request for comprehensible data 202 from a requesting device (e.g. from computer 100, etc.). Storage controller 200 then requests the associated unintelligible data sequences 210 from applicable drives 230 and the associated unintelligible data sequences 210 are returned to storage controller 200 (block 452).

Process 450 may continue with storage controller 200 retrieving separation code 300, scramble code 310, and/or sequence code 320 applicable to the associated unintelligible data sequences 210 and utilizing the retrieved separation code 300, scramble code 310, and/or sequence code 320 to reassemble the unintelligible data sequences 210 to comprehensible data 202 (block 454). Process 450 may continue with storage controller 200 returns the reassembled comprehensible data 202 to the requesting device (block 456).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A method for securely storing data in a storage system comprising:
    dividing comprehensible data into a plurality of data segments each comprising a plurality of data units;
    manipulating one or more of the plurality of data units within each data segment to form a plurality of unintelligible data segments;
    generating a decoding key based upon the dividing and the manipulating, the decoding key comprising a separation code that maps how the comprehensible data has been divided, a scramble code that maps how the one or more data units within each unintelligible data segment were manipulated, and a sequence code that maps each unintelligible data segment to a unique tape drive, and
    writing each respective unintelligible data segment to a unique removable tape cartridge installed within an external slot of the assigned unique tape drive, wherein at least two of the unique removable tape cartridges are located in distinct tape library systems at distinct physical locations and wherein the number of the plurality of unintelligible data segments equals the number of tape drives.

2. The method of claim 1, further comprising:
    retrieving each respective unintelligible data segment from the unique removable tape cartridges, and
    reassembling the comprehensible data from the retrieved unintelligible data segments utilizing the decoding key.

3. The method of claim 1, wherein each unique removable tape cartridge is located in a distinct tape library system at a distinct physical location.

4. The method of claim 1, wherein manipulating one or more of the plurality of data units within each data segment further comprises:
    scrambling the plurality of data units within each data segment.

5. The method of claim 4, wherein the plurality of data units within a first unintelligible data segment are distinctly scrambled relative to the plurality of data units within a second unintelligible data segment.

6. The method of claim 1, further comprising exporting the decoding key to a particular removable tape cartridge.

7. The method of claim 1, wherein comprehensible data comprises data units arranged in an intelligible order with inherent meaning and wherein unintelligible data segments comprise data units arranged in an unintelligible order without inherent meaning.

8. A computer program product for securely storing data, the computer program product comprising a non-transitory computer readable storage medium having program instructions embodied therewith, the program instructions readable to cause a storage system to:
    divide comprehensible data into a plurality of data segments each data segment comprising a plurality of data units;
    manipulate one or more of the plurality of data units within each data segment to form a plurality of unintelligible data segments;
    generate a decoding key based upon the dividing and the manipulating, the decoding key comprising a separation code that maps how the comprehensible data has been divided, a scramble code that maps how the one or more data units within each unintelligible data segment were manipulated, and a sequence code that maps each unintelligible data segment to a unique tape drive, and
    write each respective unintelligible data segment to a unique removable tape cartridge installed within an external slot of the assigned unique tape drive, wherein at least two of the unique removable tape cartridges are located in distinct tape library systems at distinct physical locations and wherein the number of the plurality of unintelligible data segments equals the number of tape drives.

9. The computer program product of claim 8, wherein the program instructions are readable to further cause the storage system to:
    retrieve each respective unintelligible data segment from the unique removable tape cartridges, and
    reassemble the comprehensible data from the retrieved unintelligible data segments utilizing the decoding key.

10. The computer program product of claim 8, wherein each unique removable tape cartridge is located in a distinct tape library system at a distinct physical location.

11. The computer program product of claim 8, wherein the program instructions to manipulate one or more of the plurality of data units within each data segment further cause the storage system to:
    scramble the plurality of data units within each data segment.

12. The computer program product of claim 11, wherein the plurality of data units within a first unintelligible data segment are distinctly scrambled relative to the plurality of data units within a second unintelligible data segment.

13. The computer program product of claim 8, wherein the program instructions are readable to further cause the storage system to:
    export the decoding key to a particular removable tape cartridge.

14. The computer program product of claim 8, wherein comprehensible data comprises data units arranged in an intelligible order with inherent meaning and wherein unintelligible data segments comprise data units arranged in an unintelligible order without inherent meaning.

15. The computer program product of claim 8, wherein the comprehensible data is divided into a first data segment comprising a first number of data units and a second data segment comprising a second number of data units, wherein the first number of data units does not equal the second number of data units.

16. A storage system comprising:
a plurality of tape drives that write data upon respective removable tape cartridges each installed within an external slot of an associated tape drive, the plurality of tape drives communicatively connected to a storage controller,
the storage controller configured to:
receive comprehensible data and divide the comprehensible data into a plurality of data segments comprising a plurality of data units,
manipulate one or more of the plurality of data units within each data segment to form a plurality of unintelligible data segments,
generate a decoding key based upon the division and the manipulation, the decoding key comprising a separation code that maps how the comprehensible data has been divided, a scramble code that maps how the one or more data units within each unintelligible data segment were manipulated, and a sequence code that maps each unintelligible data segment to a unique tape drive, and
send each respective unintelligible data segment to the unique tape drive amongst the plurality of tape drives to store an unintelligible data segment upon a tape cartridge of the unique tape drive, wherein at least two of the tape cartridges are located in distinct tape library systems at distinct physical locations and wherein the number of the plurality of unintelligible data segments equals the number of tape drives.

17. The storage system of claim 16, wherein the storage controller is further configured to retrieve each respective unintelligible data segment from the removable tape cartridge of the unique tape drive and reassemble the comprehensible data from the retrieved unintelligible data segments utilizing the decoding key.

18. The storage system of claim 16, wherein comprehensible data comprises data units arranged in an intelligible order with inherent meaning and wherein unintelligible data segments comprise data units arranged in an unintelligible order without inherent meaning.

19. The method of claim 1, wherein the comprehensible data is divided into a first data segment comprising a first number of data units and a second data segment comprising a second number of data units, wherein the first number of data units does not equal the second number of data units.

20. The storage system of claim 16, wherein the comprehensible data is divided into a first data segment comprising a first number of data units and a second data segment comprising a second number of data units, wherein the first number of data units does not equal the second number of data units.

* * * * *